United States Patent

[11] 3,621,243

[72] Inventors James Peter Olivier;
George Keller Hickin, both of Macon, Ga.
[21] Appl. No. 816,649
[22] Filed Apr. 16, 1969
[45] Patented Nov. 16, 1971
[73] Assignee Freeport Sulphur Company
New York, N.Y.
Continuation-in-part of application Ser. No. 618,841, Jan. 23, 1967, now Patent No. 3,449,567, dated June 10, 1969. This application Apr. 16, 1969, Ser. No. 816,649

[54] APPARATUS AND PROCESS FOR DETERMINING PARTICLE SIZE BY X-RAY ABSORPTION ANALYSIS
11 Claims, 2 Drawing Figs.

[52] U.S. Cl. .................................................... 250/43.5, 356/102
[51] Int. Cl. ........................................................ G01n 23/12
[50] Field of Search ........................................... 250/43.5 D, 43.5 R, 83.3 D; 356/102

[56] References Cited
UNITED STATES PATENTS
3,160,745  12/1964  Foster ........................... 250/43.5
3,505,519  4/1970  Fleming et al. ............... 250/43.5

Primary Examiner—Archie R. Borchelt
Attorney—W. Philip Churchill

ABSTRACT: An apparatus and process for measuring and automatically recording the particle size distribution of material in fluid suspension, which is based on the application of laws of sedimentation, and which uses a digital-programmed controller. A beam of X-rays is used to measure particle concentration in terms of the transmittance of the beam in the suspension relative to the suspending fluid. This transmittance measurement is continuously converted to a quantity proportional to the concentration of suspended material in the X-ray beam at a particular instant. The programmed digital controller continuously decreases the sedimentation distance while at the same time continuously positioning a recorder to indicate the particle size being measured at that time. The use of a digital program controller provides for a high degree of accuracy and reliability.

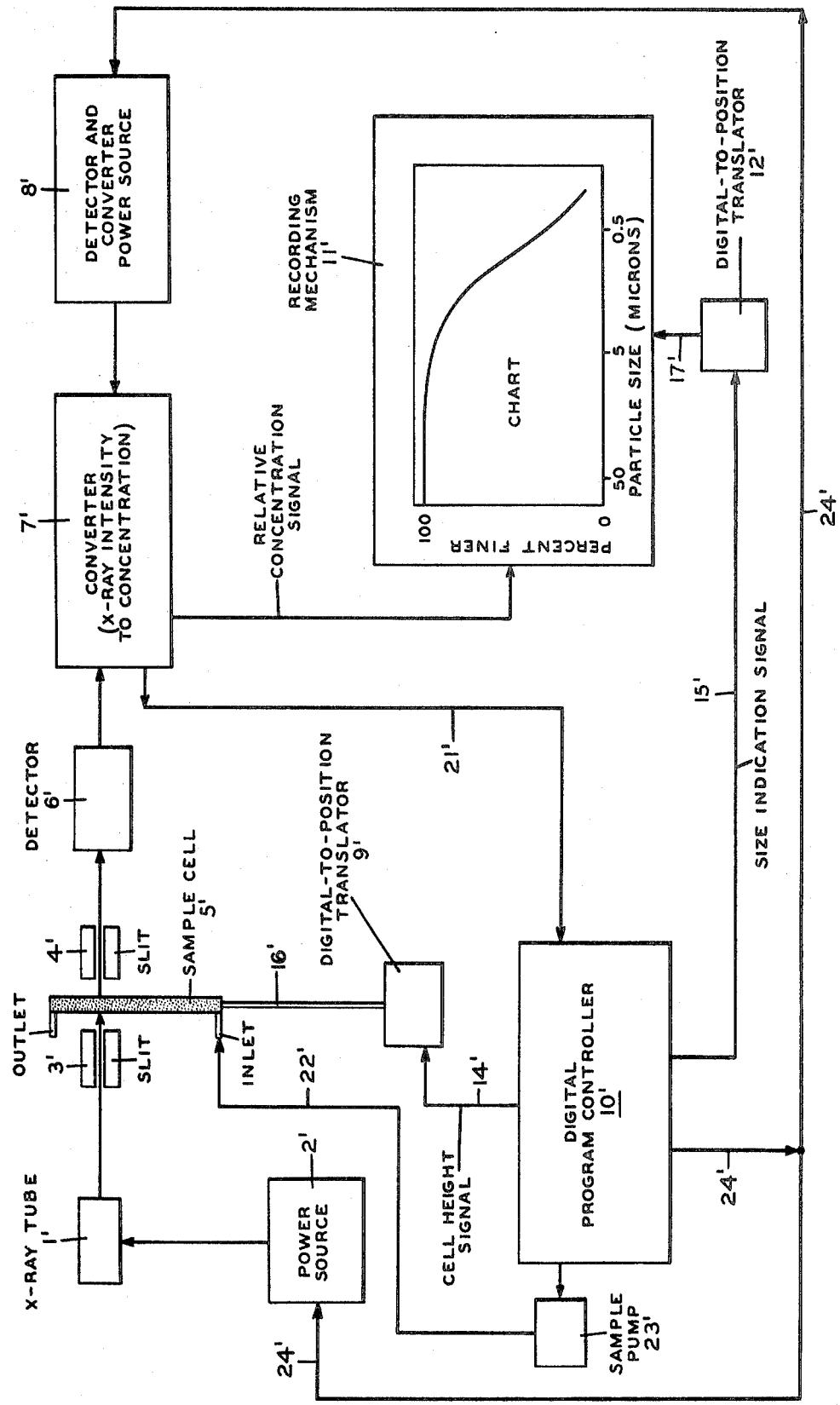

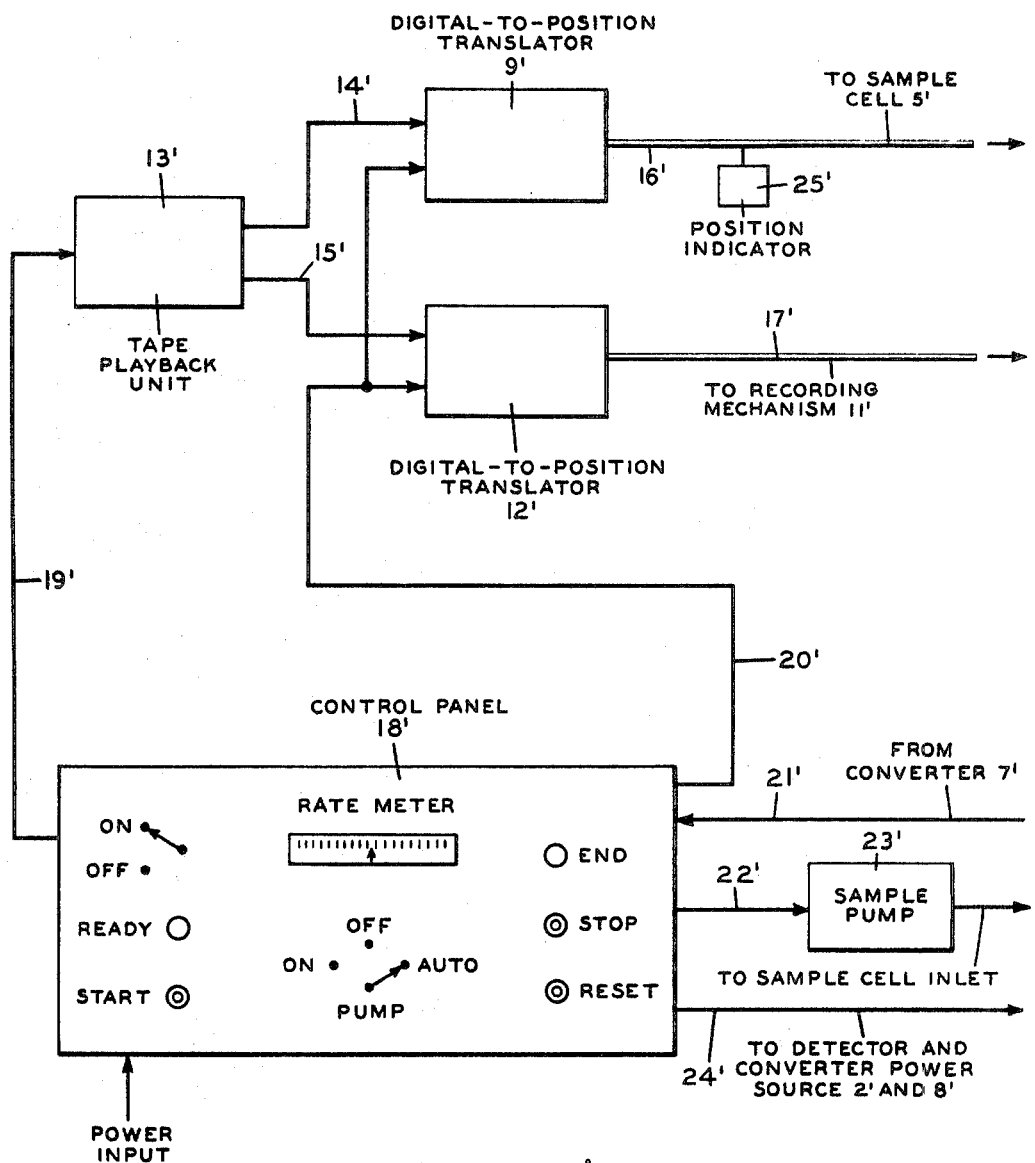
FIG. II.

APPARATUS AND PROCESS FOR DETERMINING PARTICLE SIZE BY X-RAY ABSORPTION ANALYSIS

CROSS-REFERENCE TO RELATED APPLICATION

This application is a continuation-in-part application of our copending U.S. application Ser. No. 610,841 filed Jan. 23, 1967 and issued on June 10, 1969 as U.S. Pat. No. 3,449,567.

BACKGROUND OF THE INVENTION

The present invention relates to an improved particle size analyzer over the analyzers specifically disclosed in our U.S. Pat. No. 3,449,567. It also concerns an improved process for automatically measuring the particle size distribution of a dispersion of finely divided material.

Today, the sedimentation rate technique forms the basis of most of the practical methods of particle size measurements. This technique is dependent on the fact that the rate of fall of a particle through a viscous medium is related to the size of the particle. Principles of hydrodynamics permit one to set up the exact equations describing the motion of a solid, such as a sphere, in a viscous liquid, but even in the simplest cases exact solution of these equations presents insurmountable difficulties and only approximate solutions have been obtained. The most important approximations have been introduced in the last century by the English physicist G. G. Stokes. Stokes's Law approximation for spherical particles is expressed as $$D = K v^{1/2} \quad (1)$$

where $D$ is the diameter of a falling sphere and $v$ is its equilibrium rate of fall (velocity). $K$ is a constant depending on the density $\rho$ (rho) of the sphere, and on the density $\rho_o$ (rho$_o$) and viscosity $\eta$ (eta) of the viscous medium, $K$ being equal to $$K = \left( \frac{18}{(\rho - \rho_o) g} \right)^{1/2} \quad (2)$$

wherein $g$ is the gravitational acceleration.

The above equations are satisfactory for most practical purposes in particle size determination by sedimentation techniques. It is recognized that for large particles corrections must be made to the above equations. Such corrections can be found in standard texts on fluid mechanics. As used by the inventors, in this application, the term Stokes'Law is intended to refer to equations 1) and (2) or modifications thereof as taught in standard texts, e.g., R. D. Cadle "Particle Size" (Reinhold Publishing Corp. 1965), p. 83.

In practice, truly spherical particles are uncommon, and it is recognized that Stokes'Law is not accurate for any other shape; however, the deviations are small in most cases. Since irregular shapes cannot in any case be described by a single linear dimension, it is an accepted practice to specify the size of irregular or nonspherical particles in terms of the diameter of a sphere of the same material that would have the same sedimentation velocity. This diameter is commonly referred to as "Stokes'diameter" or "Equivalent Spherical Diameter."

In general, in sedimentation analysis a dilute (less than 10 percent solids) deflocculated fluid suspension of a fine particle material is stirred to render it homogeneous. It is then allowed to stand tranquilly while undergoing sedimentation. Time is measured from the beginning of the settling period. By Stokes'Law, a particle of diameter $D$ will settle a distance $h$ in time $t$ according to the expression $$D = K(h/t)^{1/2} \quad (3)$$

where $K$ is as in equation (2) supra. Consequently, after a given time $t_i$ all particles larger than the corresponding value $D_i$ will have fallen below a distance $h$ from the surface of the suspension. If the initial concentration of particles is $C_0$ g./ml. and the concentration after time $t_i$ at distance $h$ is $C_i$ g./ml., then the percent of particles $P_i$, by weight of sample finer than $D_i$ is $$P_i = 100(C_i/C_0) \quad (4)$$

In the specific embodiments of the particle size analyzer set out in U.S. Pat. No. 3,449,567, an analog controller was used to position both the sample cell and one axis of a recorder. The positioning of the sample cell establishes the sedimentation distance. The positioning of the axis of the recorder controls the pen position which indicates particle size as a function of time.

We have found that when an analog controller is used in our particle size analyzer as shown in the specific embodiments of U.S. Pat. No. 3,449,567, the particle size analyzer is inherently limited as to the degree of the precision obtainable. Moreover, we have found that the inaccuracy of the positioning of the sample cell and an axis of the recorder chart (normally the $x$ axis) with an analog controller, is indeterminable, and not necessarily reproducible. For example, we have experienced difficulty in drawing the curves (which the photocells of an analog controller must follow) to the degree of precision that is desirable for some applications. Difficulty has also been experienced in causing the photocells of an analog controller to track said curves to the degree of precision that is desirable for some applications.

SUMMARY OF THE INVENTION

We have found that the disadvantages set out above can be overcome by the use of a digital controller in the embodiments of our particle size analyzer set out in U.S. Pat. No. 3,449,567. In our improved particle size analyzer and method, a beam of X-rays is used to measure particle concentration in terms of the transmittance of the beam through a suspension relative to the suspending fluid, e.g., water. While the transmission of visible light through a dilute suspension is a complex function of concentration, color, particle size, shape and refractive index, the transmission of X-ray wavelengths is a function only of the weight concentration of suspended solids. The X-ray beam vertical height can be made extremely small, which allows a precise measurement of the sedimentation distance. It also does not disturb the suspension as do hydrometer methods of measuring concentration.

The relation between the fraction of X-rays transmitted and the concentration of solid is given by $$\ln T = -\Delta \mu L C \quad (5)$$

where $\ln T$ is the natural log of the transmittance relative to water, $\Delta \mu$ (mu) is the difference in the X-ray mass absorption coefficients of solid and water, $L$ is the sample cell thickness and $C$ is the concentration of particles in suspension. The "-percent finer" than size $D_i$ is given by $$P_i = 100 \frac{\ln T_i}{\ln T_o} \quad (6)$$

where $T_i$ is the transmittance after a given time $t_i$ at a distance $h_i$ and $T_0$ is the transmittance at the initial starting time $t_0$.

Using a digital controller, we have been able to both position the sample cell to establish the sedimentation distance and position the axis of the recorder, normally the $x$ axis, to indicate particle size as a function of time. This has been accomplished with any desired degree of precision and with precise reproducibility.

BRIEF DESCRIPTION OF THE DRAWING

FIG. I' is a schematic view of our improved particle size analyzer.

FIG. II' is a schematic view of the digital programmer system of our improved particle size analyzer.

Referring to FIG. I' X-ray tube 1' has a high-voltage power source 2'. Horizontal slits are at 3' and 4'. A sample cell with walls transparent to X-rays, e.g. Lucite walls, is at 5' and X-ray detector is at 6'. It is desirable that an optically transparent material as Lucite be used for the cell walls to allow visual inspection for air inclusion. However, it is not essential that optically transparent material be employed. Opaque materials such as beryllium can be used. The sample cell 5' normally has horizontal dimensions of about one-half inch by one-eighth inch and is about 2 inches in height, although its dimensions are not critical. The X-ray detector 6' may be a scintillation counter, proportional counter or a Geiger counter coupled with conventional electronic circuitry.

Single converter 7', e.g., a conventional logarithmic transconductor as manufactured by Philbrick Researches, Inc., receives the signal from the X-ray detector. Detector power source and signal converter power source are at 8'. Digital position translators are at 9' and 12' and digital program controller is at 10'. An abscissa and ordinate recording mechanism, e.g., an "$x$–$y$" servo recorder such as is manufactured by Leeds & Northrup, is at 11'. It is within the scope of our invention to use any type of a recording mechanism that is capable of presenting data representing two variables, e.g., a data printer.

Referring to exemplary digital program controller system in FIG. II', tape playback unit 13' is loaded with a programmed magnetic tape upon which is recorded a series of pulses on each of two channels. Electrical cables 14' and 15' conduct pulses from the tape unit 13' to digital-to-position translators 9' and 12', respectively. Illustrative of such translators are stepping motors. Items 16' and 17' are mechanical devices which translate rotation of the stepping motors to positions of the sample cell 5' and the one axis of $x$–$y$ recorder 11' respectively (normally the $x$ axis). Control panel 18' contains an ON-OFF switch to turn on power for operating the particle size analyzer and optionally contains a meter to indicate X-ray transmitted intensity. Cable 19' conducts electrical power to tape unit 13', as well as impulses to start, stop and rewind the tape unit. Cable 20' conducts electrical power to the stepping motors and impulses to cause them to turn either in the "operate" or in the "reset" direction. Cable 21' carries electrical information from the converter unit 7' to the control panel. Cable 22' carries power to operate the sample pump 23'. Cable 24' carries power to X-ray power source 2' and to detector and converter power source 8', respectively. Optional position indicator 25' provides a visual indication of the sedimentation distance.

DESCRIPTION OF THE PREFERRED EMBODIMENTS

In operation, and referring to FIGS. I' and II', the main power is turned on at the control panel to activate the electronic circuits. The radiation from X-ray tube 1' with its associated power supply 2' is collimated by horizontal slits 3' to a beam about 0.001 inch in height by about three-eighths inch wide; this beam passes through a sample cell 5', which is about one-half inch in width and about one-eighth inch in internal thickness, holding a dilute fluid suspension of material to be analyzed. In our invention a cell of any internal thickness can be used. We have found it advantageous, because of thermoconvection currents and wall effects to use a cell of internal thickness varying from one thirty-second inch to one-half inch. It is also desirable, but not necessary, to construct the cell mounting in such a way that the cell can be readily removed for cleaning and then restored in precisely its original position. For example, locating pins and mating sockets can be conveniently employed.

X-ray detector 6' measures the transmitted radiation, the beam having passed through slits 4'. Then following suitable logarithmic conversion via converter 7' a signal is registered on one axis of $x$–$y$ recorder 11' as relative concentration (pure water=0 percent, initial suspension=100 percent). In our invention, a broad range of transmitted X-ray intensities can be used. Generally, because of the statistical error inherent in counting X-ray pulses and availability of detectors, we have found it advantageous to operate at transmitted intensities between about 500 and 50,000 counts per sec.

Sample cell 5' is driven vertically via digital-to-position translator 9' relative to the X-ray beam, so as to decrease $h$. This motion is controlled as a function of time from the start of the run by digital program controller 10', that simultaneously positions the other axis of the recorder 11' by the action of digital and position translator 12' to directly indicate the particle size, $D_1$, corresponding, through Stokes' Law, to the instantaneous values of $h_i$ and $t_i$.

Digital-to-position translator 9' is a stepping motor coupled by means of mechanical device 16' to sample cell 5'. The design of 16', which may be a lead screw attached at one end to the motor shaft and at the other end to an internally threaded slide in slide rails (not shown) upon which the sample cell 5' is mounted, is such that each step of the stepping motor moves the sample cell 5' a predetermined, precise, minute and reproducible distance. For example, if the lead screw has a pitch of 0.05 inch (20 turns per inch) and the stepping motor is a 200-step-per-revolution model (a common design), then one pulse will cause one step which will move the sample cell 0.0025 inch. Digital-to-position translator 12' is a stepping motor similar to 9', which together with mechanical linkage 17' will move the one axis of $x$–$y$ recorder 11' (normally the $x$ axis) a predetermined, precise, minute and reproducible distance. The combination of digital pulses and stepping motors provides a means of positioning the sample cell and an axis of the $x$–$y$ recorder to virtually any desired degree of precision. For instance, the use of a 40-turn-per-inch lead screw on the sample cell mechanism would result in twice the precision of the example given above. Moreover, the positioning of said components is exactly reproducible.

Tape playback unit 13' is a magnetic tape device which reproduces pulses previously recorded on a two-channel magnetic tape. On each of these channels, the position of the pulses along the tape (and hence their occurrence with respect to time as the tape moves at a constant speed over the reproducing heads) is predetermined so that through the means of the stepping motors and the mechanical devices as described previously, the $x$ axis position of the recorder 11' will at all times correctly indicate the particle size corresponding to the sedimentation distance in the sample cell in accordance with Stokes' Law. The tape unit 13' is provided with electrical relays to start, stop and rewind the tape so that operations can be electrically controlled from the control panel 18'.

Control panel 18' has a switch to turn power on to all components of the instrument. It also has a switch to turn the sample pump to ON or OFF or AUTO (automatic). The ON position is used to flush the cell with water to set the zero percent concentration adjustment (not shown) and later to flush with the sample suspension to set the 100 percent concentration position of the other axis (normally the $y$ axis) of the $x$–$y$ recorder 11', by means of the recorder sensitivity control (not shown). These operations are preliminary to the start of each automatic particle size determination. When they have been accomplished, the pump switch is placed on AUTO. The control panel has a "READY" light which indicates that the instrument is properly reset. It also has an "END" light which turns on to indicate that a complete determination has been concluded. It also has a STOP button which may be pressed to conclude a run at any desired time and a RESET button which is pressed to reset and ready the instrument by repositioning both the sample cell and one axis of the $x$–$y$ recorder (normally the $x$ axis) and rewinding the program tape for the start of the next particle size determination.

The purpose of the several numbered cables has been previously described. Position indicator 25' is attached mechanically to device 16' and provides a visual indication of the sedimentation distance. While not essential, this indicator is useful in determining the sedimentation distance with respect to time as a check on the operation of the instrument. The rate meter shown on the control panel is another useful, although not essential, device. Based on experience, the operator of the instrument knows that pure water (the zero percent concentration point) gives an X-ray intensity of, say, 25,000 pulses per second. If the indication is greatly different from this, the operator can surmise that some correction is required, e.g., the cell walls need cleaning, or the X-ray generator regulatory circuits have failed or that an air bubble is present in the cell. When the sample suspension is pumped through the cell (at which time the 100 percent concentration point on the one axis normally the $y$ axis of the $x$–$y$ recorder is set) the rate meter will decrease to say, a count of 15,000 pulses per second. From experience, the operator will know that this is in the desirable range for accurate measurements. On the other hand, if the rate meter decreases only to a count of, say, 20,000 (from 25,000 with pure water), the operator will realize that a more concentrated suspension of particles should be utilized to attain the desired accuracy of measurement.

Finally, referring to equation (1) it is seen that the digital program (pulses in each channel which cause the sample cell and one axis of the recorder to be properly positioned with respect to time in accordance with Stokes' Law) must be in accordance with the $K$ factor in Stokes' Law. Equation (2) shows that $K$ is a function of the viscosity and density of the suspending liquid and of the density of the particles subjected to measurement. In any given system, the $K$ factor can be readily calculated by equation (2) and the result translated into the basic rate of the digital program. In this embodiment of our invention this can be done by using an adjustable speed motor on the tape recorder, said speed being adjusted, prior to the beginning of a particle size determination, to provide the desired $K$ factor. Samples of differing density and viscosity parameters can thereby be analyzed to yield particle size distribution data directly in accordance with Stokes' Law.

In more detail, the operation of this embodiment is as follows: The main power can be turned on at a control panel 18' to activate the electronic circuits, and pure water caused to flow through the sample cell 5' by means of a small pump 23'. Fresh chart paper is placed on the recorder 11' and the recording pen brought to the zero percent line by means of the recorder zero control. In pumping operations, it is important that air be excluded from entering the sample cell 5'. This has been accomplished by restricting the inlet tubing to the pump to a small diameter (less than one-sixteenth inch). A pump can also be used to maintain homogeneity prior to the start of an actual determination. A deflocculated fluid suspension of sample to be analyzed, at about 5 percent solids, is then pumped to the cell 5' and the recorder pen brought to the 100 percent line with the recorder sensitivity control. The recorder pen is also made to coincide with the preprogrammed initial maximum particle size to be measured (usually 50 microns) on the chart paper. To start the determination, the control button marked "START" on control panel 18' is pressed. This activates a solenoid valve (not shown) that shuts off the sample flow to the cell 5'. After a predetermined time delay corresponding to the time required for 50-micron particles to fall an initial height $h$ in the sample cell, the Digital Program Controller 10' coupled with digital-to-position translators 9' and 12' starts to decrease the sedimentation depth and simultaneously displaces the recorder chart size indication so as to satisfy Stokes' Law at every instant. Unless the "STOP" button is pressed sooner, the apparatus will continue running for 100 minutes, at which time the recorder 11' will be registering percent finer than 0.2 micron. At this time the analyzer stops and a light marked "END" on control panel is turned on. To ready the analyzer for another determination, the "RESET" button on control panel is pressed, which restores the cell and recorder to their initial position and flushes the previous sample from the measuring cell 5'. When the reset is completed, a "READY" light on control panel is illuminated. The resultant recording on the chart paper represents the particle size distribution of the material in suspension.

The process and apparatus of our invention are applicable to all finely divided materials that can be brought into fluid suspension in a deflocculated state and that will then undergo sedimentation according to Stokes' Law in response to gravitational forces. It is not our intention that our process and apparatus be restricted to Stokes' Law as narrowly defined by equations (1) and (2). Rather as indicated earlier in the specification, our process and apparatus are applicable to any modification of Stokes' Law, as indicated in standard texts. Moreover, it should be obvious that units employed in any equations are purely arbitrary and that other indications of size, other than diameter, e.g., particle volume, weight, mass or sedimentation velocity itself, may be utilized.

Materials of industrial and technical interest on which particle size distribution is an important manufacturing parameter and for which our analyzer finds particular utility include metallic oxides, such as iron oxide, uranium oxide, magnesium oxide; powdered metals as used in metallurgical applications, such as powdered iron, nickel, copper, manganese, etc.; pigments such as clay, calcium carbonate, talc, aluminum oxide, titanium dioxide, zinc chromate, etc.; materials used as abrasives, such as silicon carbide, emery, etc.; solid lubricants such as graphite, molybdenum disulfide, boron nitride, etc. Moreover, our improved apparatus, being readily adaptable to automated operation, finds ready application as a process control instrument in industries producing materials of the above types. For example, in a size classification process step, e.g., centrifuge, the apparatus can be automated so as to sample the centrifuge output and respond to changes in particle size by modifying the operations of the centrifuge so as to maintain a constant product quality.

The finely divided material to be analyzed with our apparatus need not be a solid, but may be an emulsion. The process and apparatus of this invention only require (1) that the dispersed phase undergo sedimentation (either rising or falling) and (2) that the X-ray transmission of the initial dilute suspension differ appreciably (at least about ± 5 percent) from the pure suspending fluid for the X-ray wavelength used.

For brevity, various features have been illustrated and described in connection with a limited number of illustrative embodiments. It is intended that these features be used also in combination with features shown in other embodiments without departing from the spirit of the invention. For example, although the specific embodiment is represented by a digital program controller based on the use of a program contained on a magnetic tape, it should be understood that other digital program controllers based, for example, on perforated paper tape, or on a computer-controlled pulse generator, could be used. Moreover, it is within the scope of our invention to use a double-beam X-ray apparatus in contrast to the single-beam apparatus.

The terms and expressions that have been employed in the specification are used as terms of description and not of limitation, and there is no intention, in the use of such terms and expressions of excluding any equivalents of the features shown and described or portions thereof, since it is recognized that various modifications are possible within the scope of the invention claimed.

What is claimed is:

1. A process for automatically and rapidly determining particle size distribution of finely divided particles in suspension in a liquid medium based on the application of Stokes' Law of sedimentation, comprising continuously determining the concentration of particles by means of continuously measuring the transmittance of X-rays through the suspension, continuously converting this transmittance measurement to a quantity proportional to the concentration of suspended material in the X-ray beam at a particular instant, and continuously recording the concentration on one ordinate of a graph while, by means of a programmed digital controller, continuously decreasing the sedimentation distance and continuously positioning the other ordinate to automatically indicate particle size at every instant.

2. A process according to claim 1 operating at transmitted X-ray intensities between about 500 to 50,000 counts per second.

3. An automatic particle size analyzer comprising a sample chamber for holding a dilute fluid suspension of finely divided material, means for generating an X-ray beam, means for directing an X-ray beam horizontally through the suspension, means for measuring the intensity of the X-ray beam horizontally transmitted through the suspension, electronic or electromechanical means for converting this intensity measurement of X-ray beam transmittance to a quantity proportional to the logarithm of the intensity measurement, means for indicating said quantity as concentration, a digitally programmed means for changing the vertical distance between the point of intersection of the X-ray beam with the suspension and upper or lower surface of the suspension according to whether the particles are more or less dense than the suspending fluid, and a digitally programmed means for simultaneously providing an indication of the particle size corresponding to the elapsed sedimentation time and an instantaneous value of vertical distance according to Stokes' Law.

4. An apparatus according to claim 3 having a sample cell with an internal thickness varying from one thirty-second of an inch to one-half inch.

5. An automatic particle size analyzer comprising a sample chamber for holding a dilute fluid suspension of finely divided material, means for delivering bubble-free liquid into the sample cell, means for generating an X-ray beam, means for directing an X-ray beam horizontally through the suspension, means for measuring the intensity of the X-ray beam horizontally transmitted through the suspension, electronic or electromechanical means for converting this intensity measurement of X-ray beam transmittance to a quantity proportional to the logarithm of the intensity measurement, means for indicating said quantity as concentration, a digitally programmed means for changing the vertical distance between the point of intersection of the X-ray beam with the suspension and upper or lower surface of the suspension according to whether the particles are more or less dense than the suspending fluid, and a digitally programmed means for simultaneously providing an indication of the particle size corresponding to the elapsed sedimentation time and an instantaneous value of vertical distance according to Stokes' Law.

6. An automatic particle size analyzer comprising a sample chamber for holding a dilute fluid suspension of finely divided material, means for generating an X-ray beam, means for directing an X-ray beam horizontally through the suspension, means for measuring the intensity of the X-ray beam horizontally transmitted through the suspension, electronic or electromechanical means for converting this intensity measurement of X-ray beam transmittance to a quantity proportional to the logarithm of the intensity measurement, means for indicating said quantity as concentration, a digitally programmed means for changing the vertical distance between the point of intersection of the X-ray beam with the suspension and upper or lower surface of the suspension according to whether the particles are more or less dense than the suspending fluid, means for visually indicating the sedimentation distance, and a digitally programmed means for simultaneously providing an indication of the particle size corresponding to the elapsed sedimentation time, and an instantaneous value of vertical distance according to Stokes' Law.

7. An automatic particle size analyzer comprising a sample chamber for holding a dilute fluid suspension of finely divided material, means for generating an X-ray beam, means for directing an X-ray beam horizontally through the suspension, means for visually indicating the X-ray intensity, means for measuring the intensity of the X-ray beam horizontally transmitted through the suspension, electronic or electromechanical means for converting this intensity measurement of X-ray beam transmittance to a quantity proportional to the logarithm of the intensity measurement, means for indicating said quantity as concentration, a digitally programmed means for changing the vertical distance between the point of intersection of the X-ray beam with the suspension and upper or lower surface of the suspension according to whether the particles are more or less dense than the suspending fluid, and a digitally programmed means for simultaneously providing an indication of the particle size corresponding to the elapsed sedimentation time and an instantaneous value of vertical distance according to Stokes' Law.

8. An automatic particle size analyzer comprising a sample chamber for holding a dilute fluid suspension of finely divided material, means for generating an X-ray beam, means for directing an X-ray beam horizontally through the suspension, means for measuring the intensity of the X-ray beam horizontally transmitted through the suspension, electronic or electromechanical means for converting this intensity measurement of X-ray beam transmittance to a quantity proportional to the logarithm of the intensity measurement, means for indicating said quantity as concentration, means for compensating for various particle and liquid densities and liquid viscosities, a digitally programmed means for changing the vertical distance between the point of intersection of the X-ray beam with the suspension and upper or lower surface of the suspension according to whether the particles are more or less dense than the suspending fluid, and a digitally programmed means for simultaneously providing an indication of the particle size corresponding to the elapsed sedimentation time and an instantaneous value of vertical distance according to Stokes' Law.

9. An automatic particle size analyzer comprising a sample chamber for holding a dilute fluid suspension of finely divided material, means for mounting the sample cell to permit ready removal and exact replacement to its former position, means for generating an X-ray beam, means for directing an X-ray beam horizontally through the suspension, means for measuring the intensity of the X-ray beam horizontally transmitted through the suspension, electronic or electromechanical means for converting this intensity measurement of X-ray beam transmittance to a quantity proportional to the logarithm of the intensity measurement, means for indicating said quantity as concentration, a digitally programmed means for changing the vertical distance between the point of intersection of the X-ray beam with the suspension and upper or lower surface of the suspension according to whether the particles are more or less dense than the suspending fluid, and a digitally programmed means for simultaneously providing an indication of the particle size corresponding to the elapsed sedimentation time and an instantaneous value of vertical distance according to Stokes' Law.

10. An automatic particle size analyzer comprising a sample chamber for holding a dilute fluid suspension of finely divided material, means for maintaining homogeneity of material in sample cell, prior to the start of a determination, means for generating an X-ray beam, means for directing an X-ray beam horizontally through the suspension, means for measuring the intensity of the X-ray beam horizontally transmitted through the suspension, electronic or electromechanical means for converting this intensity measurement of X-ray beam transmittance to a quantity proportional to the logarithm of the intensity measurement, means for indicating said quantity as concentration, a digitally programmed means for changing the vertical distance between the point of intersection of the X-ray beam with the suspension and upper or lower surface of the suspension according to whether the particles are more or less dense than the suspending fluid, and a digitally programmed means for simultaneously providing an indication of the particle size corresponding to the elapsed sedimentation time and an instantaneous value of vertical distance according to Stokes' Law.

11. An automatic particle size analyzer comprising an opaque sample chamber for holding a dilute fluid suspension of finely divided material, means for generating an X-ray beam, means for directing an X-ray beam horizontally through the suspension, means for measuring the intensity of the X-ray beam horizontally transmitted through the suspension, electronic or electromechanical means for converting this intensity measurement of X-ray beam transmittance to a quantity proportional to the logarithm of the intensity measurement, means for indicating said quantity as concentration, a digitally programmed means for changing the vertical distance between the point of intersection of the X-ray beam with the suspension and upper or lower surface of the suspension according to whether the particles are more or less dense than the suspending fluid, and a digitally programmed means for simultaneously providing an indication of the particle size corresponding to the elapsed sedimentation time and an instantaneous value of vertical distance according to Stokes' Law.

UNITED STATES PATENT OFFICE
CERTIFICATE OF CORRECTION

Patent No. 3,621,243          Dated November 16, 1971

Inventor(s) James Peter Olivier and George Keller Hickin

It is certified that error appears in the above-identified patent and that said Letters Patent are hereby corrected as shown below:

Column 1, lines 34-36, replace " $K = \left( \dfrac{18}{(\rho - \rho_o)g} \right)^{1/2}$ "

by -- $K = \left( \dfrac{18\eta}{(\rho - \rho_o)g} \right)^{1/2}$ --.

Column 3, line 1, replace "Single" by -- Signal --.

Signed and sealed this 18th day of July 1972.

(SEAL)
Attest:

EDWARD M. FLETCHER, JR.　　　　　ROBERT GOTTSCHALK
Attesting Officer　　　　　　　　　　Commissioner of Patents

REEXAMINATION CERTIFICATE (68th)

United States Patent [19]
Olivier et al.

[11] B1 3,621,243
[45] Certificate Issued Apr. 5, 1983

[54] APPARATUS AND PROCESS FOR DETERMINING PARTICLE SIZE BY X-RAY ABSORPTION ANALYSIS

[75] Inventors: James Peter Olivier; George Keller Hickin, both of Macon, Ga.

[73] Assignee: Freeport Minerals Company, New York, N.Y.

Reexamination Request
No. 90/000,064, Sep. 8, 1981

Reexamination Certificate for:
Patent No.: 3,621,243
Issued.: Nov. 16, 1971
Appl. No.: 816,649
Filed: Apr. 16, 1969

Certificate of Correction issued Jul. 18, 1972.

Related U.S. Application Data

[60] Continuation-in-part of application Ser. No. 618,841, Jan. 23, 1967, Pat. No. 3,449,567.

[51] Int. Cl.³ .......................... G01N 23/12, G01N 9/24
[52] U.S. Cl. .......................... 378/51; 378/54; 356/335
[58] Field of Search ...................................... 378/51, 54

[56] References Cited

U.S. PATENT DOCUMENTS

| 3,315,066 | 4/1967 | Muta et al. ...................... 235/151.3 |
| 3,449,567 | 6/1969 | Oliver et al. ...................... 250/43.5 |

FOREIGN PATENT DOCUMENTS

| 1081749 | 1/1966 | United Kingdom. |
| 1158338 | 7/1969 | United Kingdom. |
| 1500330 | 9/1967 | France. |
| 6408043 | 1/1966 | Netherlands. |
| 6513183 | 4/1967 | Netherlands. |

OTHER PUBLICATIONS

Grabbe, Ed., "Handbook of Automation, Computation, and Control", vol. 2, pp. 29-01 to 29-05, 29-14 to 29-15 (1959).

Fisher, "The Metals Research Image Analysing Computer", in "Particle Size Analysis: Proceedings of Soc. for Anal. Chem", pp. 93-94 (1967).

Chelyustkin, "The Application of Computing Technique to Automatic Control Systems in Metallurgical Plant", pp. 1-2 (1964).

Grabbe, Ed., "Automation in Business and Industry", pp. 179; 185-186; 208-209 (1957).

(List continued on next page.)

*Primary Examiner*—David L. Willis
*Attorney, Agent, or Firm*—Ronald A. Schapira, Raul V. Fonte

[57] ABSTRACT

An apparatus and process for measuring and automatically recording the particle size distribution of material in fluid suspension, which is based on the application of laws of sedimentation, and which uses a digital-programmed controller. A beam of X-rays is used to measure particle concentration in terms of the transmittance of the beam in the suspension relative to the suspending fluid. This transmittance measurement is continuously converted to a quantity proportional to the concentration of suspended material in the X-ray beam at a particular instant. The programmed digital controller continuously decreases the sedimentation distance while at the same time continuously positioning a recorder to indicate the particle size being measured at that time. The use of a digital program controller provides for a high degree of accuracy and reliability.

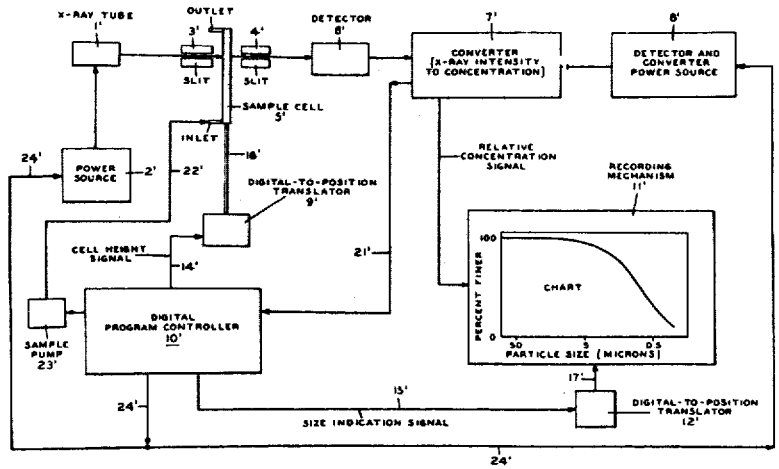

OTHER PUBLICATIONS

Ginzburg et al., "Fundamentals of Automation and Remote Control", pp. 323–24; 349–51; 383–84 (1966).

Talvite and Paulus, "Recording, Photometric Particle-Size Analyser" in "Review of Scientific Instruments" magazine, vol. 29, No. 9, Sep. 1956, pp. 763–67.

Conlin, et al., "An Instrument for Size Analysis of Fine Powders by X-Ray Absorption" in "J. of Scientific Instrumentation", vol. 44, p. 608 (1967).

Kamack, "Particle Size Determination by Centrifugal Pipet Sedimentation" in "Analytical Chemistry", vol. 23, No. 6, pp. 844–850.

Bernstein, "A Reference Wedge X-Ray Gauge", in "Non-Destructive Testing" magazine, July-Aug. 1958, pp. 305–312.

Michel and Rich, "X-Ray Photometer", in "General Electric Review" magazine February, 1947, pp. 45–48.

Gaudin & Fuerstenau, "The Transviewer—X-Rays to Measure Suspended Solids Concentration" in "Engineering and Mining Journal", vol. 159, pp. 110–112 (1959).

Childs, J., "Principles of Numerical Control", pp. 1–19 (1965).

Wilson, F., Ed., "Numerical Control in Manufacturing", pp. 154–161 (1963).

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 and 2 is confirmed.

Claims 3 and 5–11 are determined to be patentable as amended:

3. An automatic particle size analyzer comprising a sample chamber for holding a dilute fluid suspension of finely divided material, means for *continuously* generating an X-ray beam, means for *continuously* directing *the* [an] X-ray beam horizontally through the suspension, means for *continuously* measuring the intensity of the X-ray beam horizontally transmitted through the suspension, electronic or electromechanical means for *continuously* converting this intensity measurement of X-ray beam transmittance to a quantity proportional to the logarithm of the intensity measurement, means for *continuously* indicating said quantity as concentration, a digitally programmed means for *continuously* changing the vertical distance between the point of intersection of the X-ray beam with the suspension and *the* upper or lower surface of the suspension according to whether the particles are more or less dense than the suspending fluid, and a digitally programmed means for simultaneously providing *a continuous* [an] indication of the particle size corresponding to the elapsed sedimentation time and *the* [an] instantaneous value of vertical distance according to Stokes' Law; *said two digitally programmed means comprising a single digitally programmed means.*

5. An automatic particle size analyzer comprising a sample chamber for holding a dilute fluid suspension of finely divided material, means for delivering bubble-free liquid into the sample cell, means for *continuously* generating an X-ray beam, means for *continuously* directing *the* [an] X-ray beam horizontally through the suspension, means for *continuously* measuring the intensity of the X-ray beam horizontally transmitted through the suspension, electronic or electromechanical means for *continuously* converting this intensity measurement of X-ray beam transmittance to a quantity proportional to the logarithm of the intensity measurement, means for *continuously* indicating said quantity as concentration, a digitally programmed means for *continuously* changing the vertical distance between the point of intersection of the X-ray beam with the suspension and *the* upper or lower surface of the suspension according to whether the particles are more or less dense than the suspending fluid, and a digitally programmed means for simultaneously providing *a continuous* [an] indication of the particle size corresponding to the elapsed sedimentation time and *the* [an] instantaneous value of vertical distance according to Stokes' Law; *said two digitally programmed means comprising a single digitally programmed means.*

6. An automatic particle size analyzer comprising a sample chamber for holding a dilute fluid suspension of finely divided material, means for *continuously* generating an X-ray beam, means for *continuously* directing *the* [an] X-ray beam horizontally through the suspension, means for *continuously* measuring the intensity of the X-ray beam horizontally transmitted through the suspension, electronic or electromechanical means for *continuously* converting this intensity measurement of X-ray beam transmittance to a quantity proportional to the logarithm of the intensity measurement, means for *continuously* indicating said quantity as concentration, a digitally programmed means for *continuously* changing the vertical distance between the point of intersection of the X-ray beam with the suspension and *the* upper or lower surface of the suspension according to whether the particles are more or less dense than the suspending fluid, means for visually indicating the sedimentation distance, and a digitally programmed means for simultaneously providing *a continuous* [an] indication of the particle size corresponding to the elapsed sedimentation time [,] and *the* [an] instantaneous value of vertical distance according to Stokes' Law; *said two digitally programmed means comprising a single digitally programmed means.*

7. An automatic particle size analyzer comprising a sample chamber for holding a dilute fluid suspension of finely divided material, means for *continuously* generating an X-ray beam, means for *continuously* directing *the* [an] X-ray beam horizontally through the suspension, means for visually indicating the X-ray intensity, means for *continuously* measuring the intensity of the X-ray beam horizontally transmitted through the suspension, electronic or electromechanical means for *continuously* converting this intensity measurement of X-ray beam transmittance to a quantity proportional to the logarithm of the intensity measurement, means for *continuously* indicating said quantity as concentration, a digitally programmed means for *continuously* changing the vertical distance between the point of intersection of the X-ray beam with the suspension and *the* upper or lower surface of the suspension according to whether the particles are more or less dense than the suspending fluid, and a digitally programmed means for simultaneously providing *a continuous* [an] indication of the particle size corresponding to the elapsed sedimentation time and *the* [an] instantaneous value of vertical distance according to Stokes' Law; *said two digitally programmed means comprising a single digitally programmed means.*

8. An automatic particle size analyzer comprising a sample chamber for holding a dilute fluid suspension of finely divided material, means for *continuously* generating an X-ray beam, means for *continuously* directing *the* [an] X-ray beam horizontally through the suspension, means for *continuously* measuring the intensity of the X-ray beam horizontally transmitted through the suspension, electronic or electromechanical means for *continuously* converting this intensity measurement of X-ray beam transmittance to a quantity proportional to the logarithm of the intensity measurement, means for *continuously* indicating said quantity as concentration, means for compensating for various particle and liquid densities and liquid viscosities, a digitally programmed means for *continuously* changing the vertical distance between the point of intersection of the X-ray beam with the suspension and *the* upper or lower surface of the suspension according to whether the particles are more or less dense than the suspending fluid, and a digitally programmed means for simultaneously providing *a continuous* [an] indication of the particle size corresponding to the elapsed sedimentation time and *the* [an] instantaneous value of vertical distance according to Stokes' Law; *said two digitally programmed means comprising a single digitally programmed means.*

9. An automatic particle size analyzer comprising a sample chamber for holding a dilute fluid suspension of finely divided material, means for mounting the sample cell to permit ready removal and exact replacement to its former position, means for *continuously* generating an X-ray beam, means for *continuously* directing *the* [an] X-ray beam horizontally through the suspension, means for *continuously* measuring the intensity of the X-ray beam horizontally transmitted through the suspension, electronic or electromechanical means for *continuously* converting this intensity measurement of X-ray beam transmittance to a quantity proportional to the logarithm of the intensity measurement, means for *continuously* indicating said quantity as concentration, a digitally programmed means for *continuously* changing the vertical distance between the point of intersection of the X-ray beam with the suspension and *the* upper or lower surface of the suspension according to whether the particles are more or less dense than the suspending fluid, and a digitally programmed means for simultaneously providing *a continuous* [an] indication of the particle size corresponding the elapsed sedimentation time and *the* [an] instantaneous value of vertical distance according to Stokes' law; *said two digitally programmed means comprising a single digitally programmed means.*

10. An automatic particle size analyzer comprising a sample chamber for holding a dilute fluid suspension of finely divided material, means for maintaining homogeneity of material in *the* sample cell[,] prior to the start of a determination, means for *continuously* generating an X-ray beam, means for *continuously* directing *the* [an] X-ray beam horizontally through the suspension, means for *continuously* measuring the intensity of the X-ray beam horizontally transmitted through the suspension, electronic or electromechanical means for *continuously* converting this intensity measurement of X-ray beam transmittance to a quantity proportional to the logarithm of the intensity measurement, means for *continuously* indicating said quantity as concentration, a digitally programmed means for *continuously* changing the vertical distance between the point of intersection of the X-ray beam with the suspension and *the* upper or lower surface of the suspension according to whether the particles are more or less dense then the suspending fluid, and a digitally programmed means for simultaneously providing *a continuous* [an] indication of the particle size corresponding to the elapsed sedimentation time and *the* [an] instantaneous value of vertical distance according to Stokes' Law; *said two digitally programmed means comprising a single digitally programmed means.*

11. An automatic particle size analyzer comprising an opaque sample chamber for holding a dilute fluid suspension of finely divided material, means for *continuously* generating an X-ray beam, means for *continuously* directing *the* [an] X-ray beam horizontally through the suspension, means for *continuously* measuring the intensity of the X-ray beam horizontally transmitted through the suspension, electronic or electromechanical means for *continuously* converting this intensity measurement of X-ray beam transmittance to a quantity proportional to the logarithm of the intensity measurement, means for *continuously* indicating said quantity as concentration, a digitally programmed means for *continuously* changing the vertical distance between the point of intersection of the X-ray beam with the suspension and *the* upper or lower surface of the suspension according to whether the particles are more or less dense than the suspending fluid, and a digitally programmed means for simultaneously providing *a continuous* [an] indication of the particle size corresponding to the elapsed sedimentation time and *the* [an] instantaneous value of vertical distance according to Stokes' Law; *said two digitally programmed means comprising a single digitally programmed means.*

Claim 4, dependent on amended claims, is determined to be patentable.

* * * * *